Figure 1:
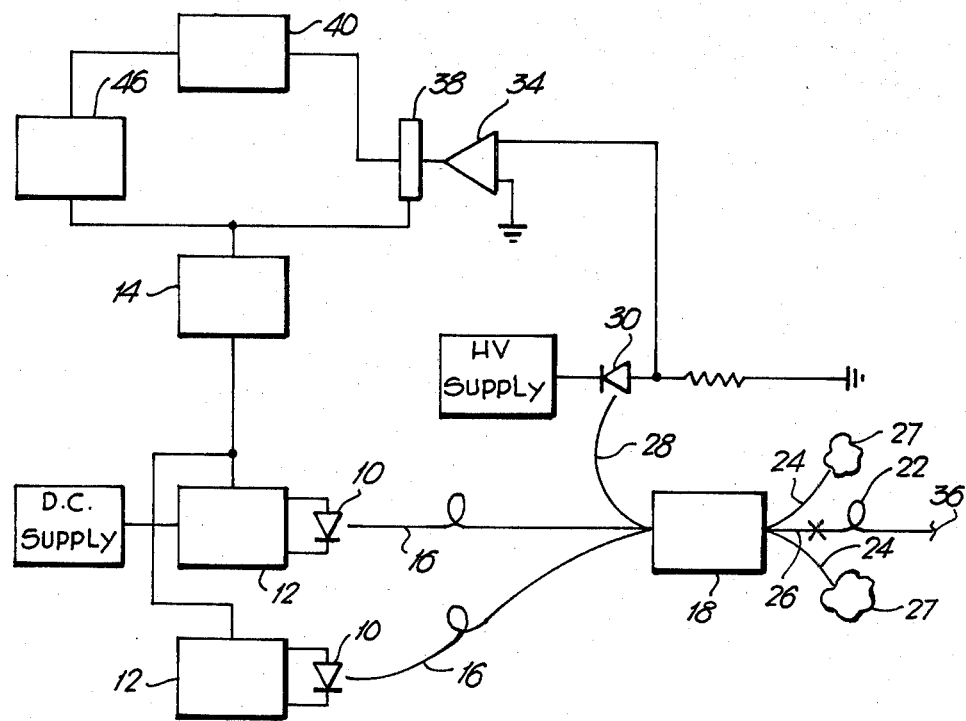

United States Patent [19]

Bage et al.

[11] 4,397,551

[45] Aug. 9, 1983

[54] METHOD AND APPARATUS FOR OPTICAL FIBER FAULT LOCATION

[75] Inventors: Marc Bage, Beloeil; Johanne Lemay, Kirkland, both of Canada

[73] Assignee: Northern Telecom Limited, Montreal, Canada

[21] Appl. No.: 316,932

[22] Filed: Oct. 29, 1981

[51] Int. Cl.³ .................................... G01N 21/88
[52] U.S. Cl. ............................................ 356/73.1
[58] Field of Search ................................. 356/73.1

[56] References Cited

U.S. PATENT DOCUMENTS 4,320,968 3/1982 Wakabayashi et al. ............. 356/73.1

Primary Examiner—Vincent P. McGraw
Attorney, Agent, or Firm—Stuart L. Wilkinson

[57] ABSTRACT

A discontinuity within an optical fiber is located using a reflectometry technique. A swept frequency sinusoidal signal is launched into the fiber, is reflected from the remote discontinuity, and is returned to the fiber input end. The signal consists of the combined outputs of two optical sources identically frequency modulated and having output wavelengths $\lambda_1$, $\lambda_2$ separated by several nanometers. The light at $\lambda_1$ has a group velocity different from the light at $\lambda_2$ and consequently, reflected light components at $\lambda_1$ and $\lambda_2$ interfere with each other at the fiber input end. The interference signal is frequency dependent and from the frequency dependence the distance from the fiber input end to the discontinuity can be calculated. The received signal is dependent also on the difference in group index at $\lambda_1$ and $\lambda_2$, this difference being relatively insensitive to temperature, stress and fiber composition. In contrast, the group index for a particular wavelength is sensitive to these parameters and so affects the results of known single wavelength and pulse techniques. In this respect the method proposed is more accurate than known optical time-domain and frequency-domain reflectometry techniques.

7 Claims, 2 Drawing Figures

FREQUENCY

METHOD AND APPARATUS FOR OPTICAL FIBER FAULT LOCATION

This invention relates to a method and apparatus for locating faults in optical fibers used in fiber optic communications systems. With currently available fiber offering losses of less than 1 dB/Km, a repeater spacing or uninterrupted optical cable length of about 25 km can be contemplated. A problem arises if a fiber in the cable should develop a fault such as a break. A method is required for accurately predicting the position of the fiber fault so that repair or replacement can be effected rapidly and with minimum disruption to the cable. In a known method of fault location termed optical time-domain reflectometry (OTDR), a discrete pulse is launched into a fiber under test and the time taken for the pulse to propagate to and return from a reflecting fault is measured. Knowing the velocity of light in the material of the fiber, the distance of the fault from the fiber input end can be derived. Although in response to launching the pulse there will be continuous backscatter from along the fiber, the reflectivity of a fiber break can be anything up to 3.5% depending on the nature of the break, so ensuring a distinctive indication within the backscatter response. If the discontinuity has zero reflectivity, then cessation of backscatter can be detected.

In a newly developed method of fault location termed optical frequency-domain reflectometry (OFDR), a swept frequency sinusoidal signal is launched into the fiber from one end and propagates along it. A signal propagating back from the discontinuity to the fiber input end interferes constructively or destructively with the input signal depending on the phase difference between them. Both the amplitude and phase of the resulting interference signal vary periodically with frequency. From the periodicity, the distance from the input end of the fiber to the discontinuity can be derived. OFDR offers a signal-to-noise ratio advantage over OTDR since, in the latter, discrete pulses are used whereas in OFDR an extensive frequency sweep is used and noise reduction techniques can be effected.

Both OTDR and OFDR are, however, dependent on the refractive index of the fiber which can vary considerably with temperature, stress and fiber composition. A modification of OFDR termed dual wavelength optical frequency-domain reflectometry (DWOFDR) is now proposed in which any refractive index fluctuation in the fiber has little effect on the accuracy of fault location. Where in the specification reference is made to a fiber discontinuity, it will be understood that the discontinuity is reflecting.

According to one aspect of the invention there is provided apparatus for monitoring the position of a discontinuity in an optical fiber, the apparatus comprising means for launching a swept frequency optical signal into one end of the fiber, the optical signal having identically modulated components at wavelengths $\lambda_1$ and $\lambda_2$ separated by a few nanometers, said components having different group velocities within the fiber, means for receiving from said one end of the fiber an interference signal between the two components propagating back from the discontinuity, said interference signal having amplitude variation caused by interference between said two components, and means for analyzing the frequency spectrum of the interference signal whereby, from a frequency related parameter thereof, to derive the distance from the fiber input end to the discontinuity.

The apparatus includes a spectrum analyzing means for identifying extrema in the variation of the interference signal amplitude as a function of frequency.

Said means for launching the swept frequency optical signal preferably comprises a pair of injection lasers having spectral line outputs, respective driver circuits for the lasers, and a tracking generator having an output controlling the laser driver circuits. The tracking generator can have an output to said spectrum analyzing means whereby to synchronize operation of the analyzing means and the laser driver circuits. Means should be provided to maintain the pair of injection lasers at the same temperature to stabilize their wavelengths.

According to another aspect of the invention there is provided a method of measuring the distance from an input end of a fiber to a discontinuity within the fiber, the method comprising launching a swept frequency optical input signal into the input end of the fiber, the signal having components at wavelengths $\lambda_1$ and $\lambda_2$ separated by several nanometers, the $\lambda_1$ component having a group velocity different from the group velocity of the $\lambda_2$ component within the fiber, the method further comprising receiving at the fiber input end a corresponding interference signal between the two components propagating back from the discontinuity, analyzing the frequency spectrum of the interference signal, and, from a frequency related parameter of said interference signal deriving the distance from the input end to the discontinuity.

Figure 2:
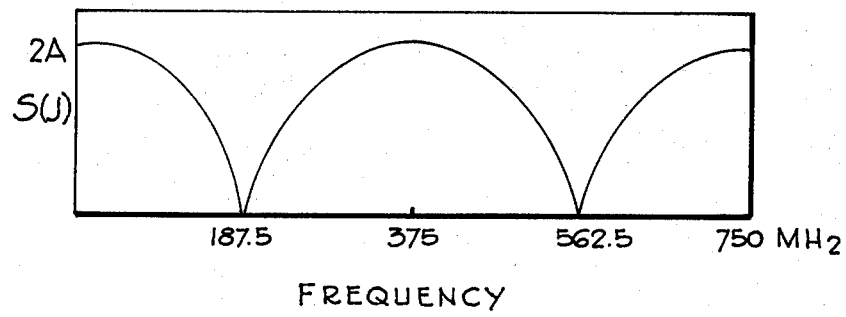

An embodiment of the invention will now be described by way of example with reference to the accompanying drawings in which:

FIG. 1 is a schematic representation of apparatus according to the present invention; and FIG. 2 illustrates the frequency spectrum of an interference signal used to locate a fiber fault.

Referring in detail to FIG. 1, two double heterostructure laser diodes 10 are biased above lasing threshold to produce continuous wave emission. The lasers are mounted on a common heatsink (not shown) so are at the same temperature as one another. The lasers 10 have spectral line outputs with wavelengths $\lambda_1$ and $\lambda_2$ separated by 20 nanometers and centered around 1.1 $\mu$m. The lasers 10 are driven by laser driver circuits 12 which are themselves under the control of a tracking generator 14 by means of which the lasers are modulated to give an identically modulated swept frequency output.

The laser outputs are launched into ports 16 of a coupler 18. Although many coupler designs can be used, a suitable coupler is made by twisting dielectric optical waveguide lengths together, heating a central twist region until molten and then drawing the twist region so that the fiber length coalesce.

One far end port 26 of the coupler is fusion spliced to the fiber 22 under test, the other far end ports 24 being rendered non-reflective by immersion in oil 27 of matching refractive index. The near end ports 16 are fixed closely enough to the laser diodes 10 to guarantee 1 mW input to the test fiber 22, and another near end port 28 is fixed to direct light from the coupler to an avalanche photodiode (APD) 30. The output from the photodiode 30 is taken to an amplifier 34. The output of the amplifier 34 is taken through a tunable narrowband filter 38 under the control of the tracking generator 14 and then to an amplitude detector 40, the output of which is then displayed on a CRT 46 as a function of the sweep frequency.

Alternately, the frequency analysis components of the circuit can be substituted by a standard spectrum analyzer if desired.

In operation, a swept frequency, sinusoidally modulated optical signal having components at $\lambda_1$ and $\lambda_2$ is launched into the near end ports 16, propagates through the coupler 18 and the fiber 22 under test, (being continuously backscattered along the way), and is finally reflected at a distant break 36. The components $\lambda_1$ and $\lambda_2$ have different group velocities within the fiber. Consequently, the components interfere constructively or destructively, such interference being evident in the reflected signal received at near end port 28 of the coupler. The interference signal is received at the APD 30 and amplified. The amplitude of the resulting interference signal generated during the frequency sweep is then displayed on the CRT. The resulting signal can be shown to have amplitude:

$$S(f) = |Ae^{-j2\pi fL(N1-N2)c} + Be^{+j2\pi fL(N1-N2)/c}| \quad (i)$$

where:
A and B are the powers of the reflected signals at wavelengths $\lambda_1$ and $\lambda_2$ respectively;
f is the frequency of the input signal;
$N_1$ and $N_2$ are group indices of the fiber at wavelengths $\lambda_1$ and $\lambda_2$ respectively;
L is the distance from the fiber input end to the discontinuity; and
c is the speed of light in vacuum.

With reference to FIG. 2, and assuming the powers of the reflected components are equal, (A=B), the amplitude of the interference signal exhibits a sharp minimum at $$f_d = \frac{0.25c}{L(N_1 - N_2)} \quad (ii)$$

From the equation (ii), L, the distance from the fiber input end to the break, can be computed. As shown in the example of FIG. 2, the first minimum appears at approximately 187.5 MHz from which it can be calculated that reflection occurs at a distance 1 km from the fiber input end.

For comparison, the frequency of first constructive interference in an OFDR method is:

$$f_o = 0.5c/LN_o \quad (iii)$$

where $N_o$ is the group index at the single wavelength.

Comparing the two equations (ii) and (iii) above, it will be seen that the frequency $f_o$ is inversely proportional to the group index of the fiber whereas frequency $f_d$ is inversely proportional to the difference between the group indices $N_1$ and $N_2$. As indicated previously, the individual indices may fluctuate markedly, mainly because of temperature but also because of stress and compositional variation along the length of the fiber. While this may affect $f_o$, there is negligible effect on $f_d$ since any change in group index at $\lambda_1$ is accompanied by an equivalent change in group index at $\lambda_2$ so the difference in group indices, and therefore the difference in group velocity on which fiber length measurement is based, remains substantially constant. Also the frequency $f_d$ of the DWOFDR method corresponds to a sharp minimum which can be detected with greater accuracy than the frequency $f_o$ of the OFDR method because the extrema of the latter are flat.

For the 20 nm separation between $\lambda_1$ and $\lambda_2$, the difference $N_2-N_1$ is of the order of 0.0004. From equation (ii) above, a fault 1 km distant from the fiber input end requires a 187.5 MHz modulation signal. The method can thus be used on current high grade telecommunication fiber whose bandwidth is greater than 187.5 MHz—km. If a lower wavelength separation is used then the necessary modulation frequency is higher. On the other hand, if too high a wavelength separation is used, then the group velocities of the two components will be subject to disparate variations owing to fluctuations of temperature stress and fiber composition, and thus the primary advantage of the invention will be lost. Because high modulation frequencies are necessary in DWOFDR, resulting electronic constraints limit the minimum detection distance making DWOFDR suitable for medium to long range operations.

In the embodiment described, the components at wavelengths $\lambda_1$ and $\lambda_2$ combine optically and an electrical analog of the resulting interference signal is produced by the APD 30. Alternatively, the components at $\lambda_1$ and $\lambda_2$ are separated using a wavelength division demultiplexer, the individual optical signals are used to generate separate electrical analog signals and these are then combined together to generate an electrical interference signal on which spectrum analysis is performed.

Although the primary advantage of the method of this invention is in aerial cable to minimize the influence of temperature fluctuation on measurement accuracy, the method should find application in compensating for stress or inhomogeneity of buried or submarine fibers.

To a first approximation thermal sensitivity of this method can be reduced to zero at a "medium" wavelength $(\lambda^1+\lambda_2)/2$ of 1.1 μm. Optimum wavelength, which can be determined from the fiber refractive index, should be advantageously close to the minimum attenuation region of most fibers used for telecommunications purposes. The maximum range of DWOFDR depends on the wavelength used, on the coupled power and on receiver sensitivity. The range obtainable increases with wavelength.

It should be mentioned that the interference signal corresponding to a reflective discontinuity, may be complicated somewhat by continuous backscatter from incremental elements along the length of the fiber. However, incoming data during the frequency sweep can be subjected to averaging techniques to remove this noise.

What is claimed is:

1. A method of measuring the distance from an input end of a fiber to a discontinuity within the fiber, the method comprising launching a swept frequency optical input signal into the input end of the fiber, the signal having components at wavelengths $\lambda_1$ and $\lambda_2$ separated by several nanometers, the $\lambda_1$ component having a group velocity different from the group velocity of the $\lambda_2$ component, receiving at the fiber input end a corresponding interference signal propagating back from the discontinuity, analyzing the frequency spectrum of the interference signal, and, from a frequency related parameter of said frequency spectrum, deriving the distance from the input end to the discontinuity.

2. A method as claimed in claim 1, in which the frequency related parameter in the frequency spectrum is the frequency corresponding to a first amplitude minimum in said frequency spectrum.

3. Apparatus for monitoring the position of a discontiuity within an optical fiber, the apparatus comprising means for launching a swept frequency optical signal into one end of the fiber, the optical signal having identically modulated components at wavelengths $\lambda_1$ and $\lambda_2$ separated by a few nanometers, said components having different group velocities within the fiber, means for receiving from said one end of the fiber an interference signal propagating back from the discontinuity, said interference signal having amplitude variation caused by interference between said two components, and spectrum analyzing means for analyzing the frequency spectrum of the interference signal whereby, from a frequency related parameter thereof to derive the distance from the fiber input end to the discontinuity.

4. Apparatus as claimed in claim 3, in which the spectrum analyzing means includes an amplitude detector.

5. Apparatus as claimed in claim 3, in which the spectrum analyzing means further comprises a tunable filter and means for setting the pass band of the filter at the sweep frequency.

6. Apparatus as claimed in claim 3, in which said means for launching the swept frequency optical signal includes first and second injection lasers, associated laser driver circuits, and a tracking generator having outputs controlling the laser driver circuits.

7. Apparatus as claimed in claim 6, in which the tracking generator has an output to said means for analyzing the frequency spectrum of the interference signal whereby to synchronize operation thereof with the laser driver circuits.

* * * * *